United States Patent Office

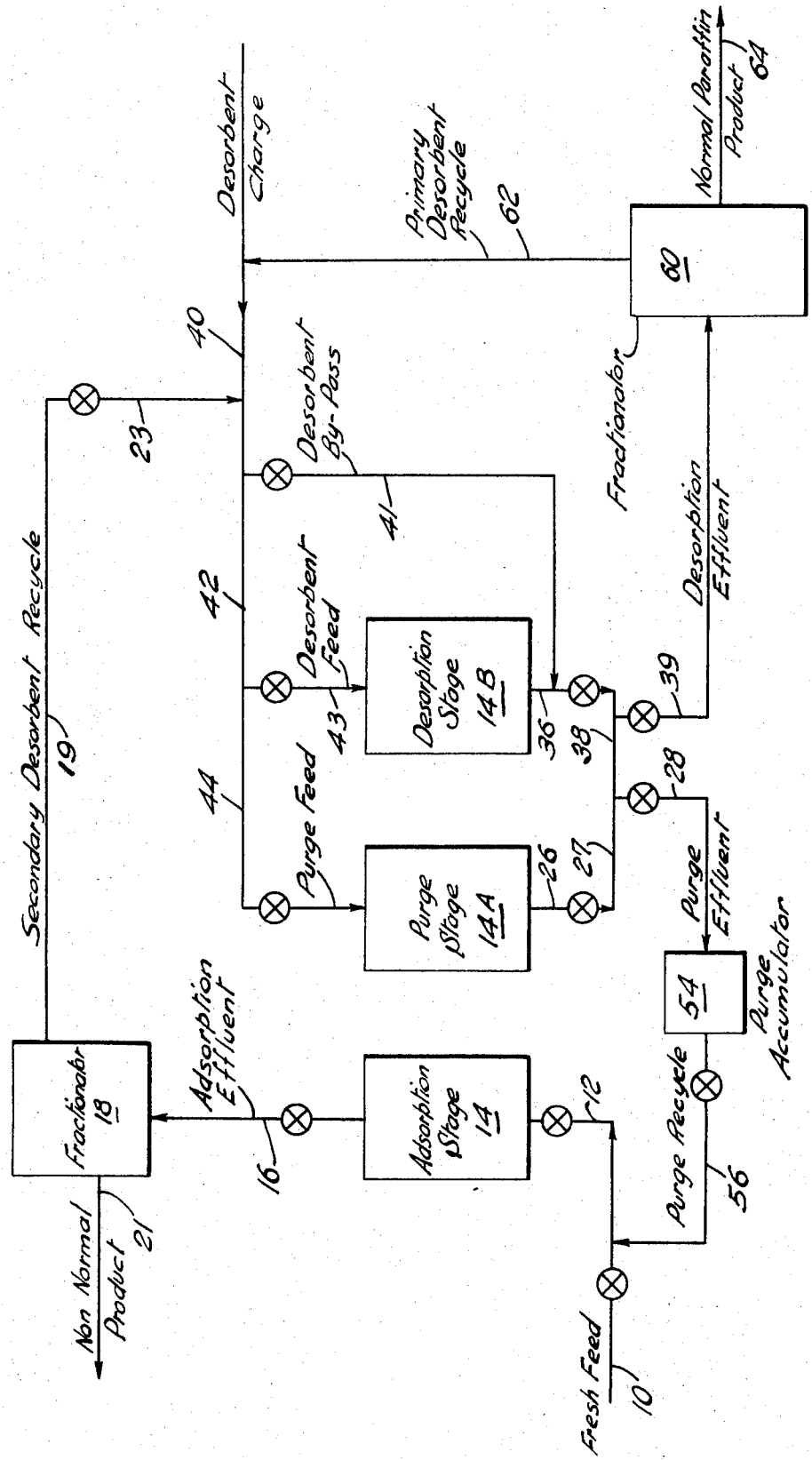

3,539,501
Patented Nov. 10, 1970

1

3,539,501
MOLECULAR SIEVE DESORPTION WITH A MIXTURE OF HYDROCARBONS
Richard W. Stokeld, Jr., Wappingers Falls, N.Y., assignor to Texaco Inc., New York, N.Y., a corporation of Delaware
Filed Oct. 31, 1968, Ser. No. 772,279
Int. Cl. C07c 7/12
U.S. Cl. 208—310                        9 Claims

ABSTRACT OF THE DISCLOSURE

A vapor phase process for the separation of straight chain hydrocarbon components from petroleum fractions by a molecular sieve selective adsorbent, comprising adsorption, purge and desorption steps, the purge and desorption steps being carried out using a straight chain hydrocarbon mixture comprising a major amount of at least one heavy straight chain hydrocarbon having a molecular weight of from 1 to 3 carbon atoms less than the molecular weight of the lightest straight chain hydrocarbon component of the petroleum fraction being separated by the process and a minor amount of at least one light straight chain hydrocarbon having a molecular weight of from 5 to 7 carbon atoms less than the lightest straight chain hydrocarbon component of the petroleum fraction being separated by the process.

---

The present invention is related to an improved vapor phase method of separating straight chain hydrocarbons from petroleum fractions.

It is known from commonly assigned U.S. Pat. No. 3,373,103 that $C_{10}$–$C_{20}$ straight chain hydrocarbons can be separated from vapor phase mixtures thereof with non-straight chain hydrocarbons by a processing cycle including the steps of adsorption, purge and desorption carried out at elevated temperatures and pressures.

The improved process of the present invention is particularly directed to the separation and recovery of high molecular weight straight chain hydrocarbon from petroleum fractions containing mixtures of straight chain and non-straight chain hydrocarbons by a process comprising an adsorption step carried out at an elevated temperature and superatmospheric pressure wherein the vaporized petroleum fraction is contacted in an adsorption zone containing a bed of selective adsorbent of Type 5 A. structure to adsorb the straight chain hydrocarbon components of the mixture therefrom in the pores of said adsorbent and to saturate same with the adsorbed straight chain hydrocarbons; the adsorption step is terminated when the adsorption zone contains a straight chain hydrocarbon overcharge of between 0.5 and 15% by weight: a depressuring step wherein the pressure in the adsorption zone is reduced to a value below that employed in the adsorption step, but not below atmospheric pressure; a purge step wherein the laden adsorbent is contacted with a purge medium comprising a straight chain hydrocarbon mixture hereinafter more fully defined, in vapor phase to remove surface-adsorbed hydrocarbons and hydrocarbons in the void spaces of the bed therefrom; the purge step is discontinued; a repressuring step to attain a pressure in the adsorption vessel greater than the pressure during the adsorption step; repressurization is terminated; a desorption step wherein the pore adsorbed straight chain hydrocarbons of the selective adsorbent are desorbed in the vapor phase with a desorbing medium comprising a straight chain hydrocarbon mixture, as hereinafter more fully defined; the desorption step is terminated when from 70 to 90% of the pore adsorbed components have been removed, a depressuring step to reduce the pressure to the adsorption pressure; and repeating said operation in sequence.

The process of the present invention is particularly adaptable for the processing of high boiling petroleum fractions in the heavy kerosine and gas oil ranges, i.e. having boiling point temperatures ranging from about 325 to 670° F. and containing $C_{10}$–$C_{20}$ straight chain hydrocarbons in relatively significant amounts on the order of 15% or more by weight and especially $C_{13}$–$C_{20}$ straight chain hydrocarbons.

The expression "surface-adsorbed hydrocarbons" as used hereinabove includes all adsorption on the sieve other than in the sieve cages (within the zeolite crystal). The expression includes all the non-normal compounds adsorbed in the macro-pores of the sieve (inter-crystalline pores) as well as those adsorbed on the surface.

The expression "straight chain hydrocarbon mixture" as used in the specification and claims in connection with the purge medium and the desorbing medium refers to a mixture of straight chain hydrocarbons containing a major amount of at least one heavy straight chain hydrocarbon having a molecular weight of from 1 to 3 carbon atoms less than the lightest straight chain hydrocarbon component of the petroleum fraction being separated and a minor amount of at least one light straight chain hydrocarbon having a molecular weight of from 5 to 7 carbon atoms less than the lightest straight chain hydrocarbon component of the petroleum fraction being separated by the process.

The method of the present invention is particularly adaptable for the production of high purity normal paraffins in excellent yields in a rapid, efficient and economical manner.

Accordingly, it is an object of the present invention to provide an improved hydrocarbon treating process. A further object is to provide an improved method of producing relatively high molecular weight straight chain hydrocarbons of a high degree of purity in commercially attractive yields from mixtures of such hydrocarbon and non-straight chain hydrocarbons. A straight further object is to provide an improved cyclic hydrocarbon separation process which is conducted in a relatively short period of time.

How these and other objects of this invention are acomplished will become apparent with reference to the acompanying disclosure. In at least one embodiment of the invention at least one of the foregoing objects will be achieved.

By "straight chain" hydrocarbon is meant any aliphatic or acryclic or open chain hydrocarbon which does not possess side chain branching. Representative straight chain hydrocarbons are the normal paraffins and the normal olefins, mono- or polyolefins, including the straight chain acetylenic hydrocarbons. The "non-straight chain" hydrocarbons comprise the aromatic and naphthenic hydrocarbons as well as the isoparaffinic, isoolefinic hydrocarbons and the like.

The practice of this invention is applicable to any solid selective adsorbent which selectively adsorbs straight chain hydrocarbons to the substantial exclusion of non-straight chain hydrocarbons. This invention, however, is particularly applicable to a molecular sieve selective adsorbent such as a calcium aluminosilicate selective adsorbent, apparently actually a sodium calcium aluminosilicate, marketed by Linde Company, and designated Linde Molecular Sieve Type 5A or 5A-45. The crystals of this particular calcium aluminosilicate have a pore size or opening of about 5 A. units, a pore size sufficiently large to admit straight chain hydrocarbons, such as the normal paraffins and the normal olefins, to the substantial exclusion of the non-straight chain hydrocarbons, i.e., naphthenic, aromatic, isoparaffinic and isoolefinic hydrocarbons. This particular selective adsorbent is available in various sizes such as in the form of ⅛" or 1/16" diameter extrusions, or as a finely divided powder having a particle size in the range of 0.5–5.0 microns. In general, a selective adsorbent employed in the practice of this invention may be in any suitable form or shape, granular, spheroidal or microspheroidal.

The method of the present invention should be carried out in the vapor phase and under essentially isothermal conditions. The particular operating conditions selected are dependent on the nature of the feed stream to the adsorption zone, the carbon number range of the feed stream and desired product stream as well as the carbon number distribution (relative amounts of each carbon number) within the range, the straight chain hydrocarbon content of the feed stream and the olefinic, sulfur, nitrogen and aromatic content thereof. In general, the feed stream preferably should be relatively low in olefins, sulfur, nitrogen and aromatics content and these impurities can be readily reduced to acceptable limits or removed in a manner well known in the art such as by mild hydrogenation involving mild catalytic reforming. In addition, the feed stream should be relatively free from the lower molecular weight hydrocarbons such as in the range from about $C_1$ to $C_9$ as such light hydrocarbons complicate recovery of the desorbing medium.

In the accompanying drawing the single figure thereof illustrates a schematic flow diagram of one method of carrying out the present invention. In the drawing, vessels 14, 14A and 14B represent the same sieve case in three different phases of the operating cycle, adsorption, purge and desorption phases.

In the drawing a vapor phase mixture of relatively high molecular weight straight chain and non-straight chain hydrocarbons is charged by way of lines 10 and 12 into a lower end of an adsorption vessel 14 maintained at an elevated temperature and superatmospheric pressure containing therein a bed of synthetic calcium sodium aluminosilicate of Type 5A structure such as a Linde 5A–45 Molecular Sieve. In the adsorption vessel 14 the straight chain components of the feed mixture are adsorbed by the selective adsorbent. From the outlet end of the vessel 14 through line 16 there is recovered a treated effluent mixture now containing a substantially reduced amount of straight chain hydrocarbons therein as well as desorbing medium present in the sieve cages from a previous desorption step and the effluent is passed to a fractionator 18 from which is recovered a non-straight chain hydrocarbon product stream by way of line 21 which can be passed to a storage vessel not shown for use as a fuel source and a desorbent recycle stream by way of line 19 which can be returned to desorption feed line 40 by way of line 23. The desorbent medium present in the adsorption effluent is obtained from the previous cycle wherein during desorption, a portion of the desorbing medium is adsorbed by the sieve pores from which the higher molecular weight straight chain components have been removed.

At the completion of the adsorption step, hereinafter more fully described, the feed in line 10 to adsorption vessel 14 is discontinued. In the depressuring step, the vessel 14A is depressured by venting through lines 26, 27, 28 and accumulator 54 maintained at about atmospheric pressure. When vessel 14A is at the selected low pressure in the pressuring step, the purge step is begun. In the purging step, a stream of desorbing medium contained in line 40, 42 and 44 is introduced countercurrent to the flow of the feed stream 10 into vessel 14A and a purge effluent stream is withdrawn therefrom by way of lines 26, 27 and 28 and passed to purge accumulator 54. At the end of the purge step the repressuring step is commenced.

In the repressuring step, the flow of the stream of desorbing medium into vessel 14A by way of line 44 was continued to increase the pressure in the vessel to the selected desorbing pressure. When the selected desorbing pressure is attained in vessel 14A the desorption step is begun.

In the desorption step, the desorbing medium in the vapor state is passed through lines 40, 42 and 43 into the adsorbent vessel 14B containing the straight chain hydrocarbon components adsorbed by the selective adsorbent. The flow of the desorbing medium is also countercurrent to the feed flow during the adsorption step.

Countercurrent desorption flow (i.e. opposite to the flow in the vessel during adsorption) is highly desirable to assist in removing adsorbed straight chain hydrocarbons from the selective adsorbent.

The resulting desorption effluent is withdrawn from vessel 14B by way of line 36 and passed through lines 38 and 39 to fractionator 60 wherein the desorbate and desorbing medium are separately recovered. The adsorbed straight chain hydrocarbons in the desorbate are recovered from fractionator 60 by way of line 64. The desorbing medium is recovered by way of line 62 and can be returned to line 40 for further use.

At the termination of the desorption step, vessel 14B is depressured to attain the lower pressure used in the adsorption step and the cycle is repeated by introducing an additional quantity of fresh feed into vessel 14 by way of line 10 and line 12.

The adsorption step in the process of the present invention is carried out with the feed stream being in the vapor phase.

The particular adsorption temperature used varies with the type of charge stock, carbon number content thereof, and desired range of the straight chain hydrocarbons to be recovered from the charge stock. However, it is necessary to carry out the adsorption step at a temperature above the dew point of the vaporized feed stream to minimize surface adsorption of the non-adsorbed hydrocarbons on the selective adsorbent and also to decrease the holdup of the charge stock in the sieve voids. A further requirement, which controls the upper temperature limit of the adsorption step is the need to avoid cracking of the charge stock. Keeping in mind these lower and upper temperature limitations, it has been found that a temperature range of about 575–675° F. in the adsorption step will permit excellent separations.

In the adsorption step, the adsorption vessel should be maintained at a positive pressure above atmospheric pressure to permit the selective adsorbent to adsorb an additional quantity of normal straight chain hydrocarbons in the adsorption step. It has been found that maintaining the adsorption vessel at a pressure of between 10 to 50 p.s.i.g. during the adsorption step affords good results in terms of rapid adsorption of the adsorbable components of the feed stream by the selective adsorbent.

The charge stock is introduced into the adsorption vessel at a selected rate and the feed is continued until the selective adsorbent is loaded with normal straight chain components of the feed. Introduction of feed is preferably continued beyond the point at which the straight chain components of the feed begin to "breakthrough" into the adsorption effluent (non-adsorbed portion of the feed). Introduction of the feed into the adsorption vessel is preferably terminated when there is a "normal paraffin overcharge" of between about 0.5 and 15 weight percent.

"Normal paraffin overcharge" is defined as the amount of n-paraffins in the feed stock to the adsorption vessel which is charged during the adsorption step in excess of the total amount on a weight basis of recovered normal paraffins during desorption and the normal paraffins recovered in the depressuring and purge effluent streams expressed as a percentage of normal paraffins charged. The utilization of the selective adsorbent at maximum efficiency is a material factor in the process of the present invention because it compensates for the less than complete desorption of the adsorbed straight chain hydrocarbons in the subsequent desorption step. The overcharge range of 0.5–15 weight percent is suitable for excellent sieve utilization in a short processing time.

After termination of the adsorption step the adsorption vessel is depressured in a depressuring step to a lower pressure than the adsorption pressure. This depressuring step is required to remove some of the surface adsorbed non-straight chain hydrocarbons from the selective adsorbent and to also begin to remove from the adsorption vessel, particularly from the void spaces between the selective adsorbent some of the unadsorbed portion of the charge stock while minimizing loss of the adsorbed straight chain hydrocarbons from the sieve pores.

The depressuring step is terminated when the adsorption pressure is decreased to about atmospheric pressure, and advantageously in the range of 0–10 p.s.i.g. The depressuring step is carried out at substantially the same temperature as was used in the adsorption step.

Following termination of the depressuring step, a purge step is begun using as the purge medium a vaporized slip-stream of the same material subsequently used as the desorbing medium. The purge step is carried out at substantially the same temperature as the adsorption and depressuring steps, and at a reduced pressure attained in the depressuring step. In this purge step a stream of the vaporized desorption medium is introduced into the adsorption vessel in a direction countercurrent to the flow of the charge stock thereto. The purge medium removes the remaining portion of the charge stock from the adsorption vessel and the surface adsorbed non-straight chain components from the selective adsorbent. In the purge step it is necessary to maintain the purge medium in the vapor state for efficient operation and the flow rate thereof at a value between 50 and 1000 vapor hourly space velocity (volume of vapor per hour per volume of adsorbent) and the purge volume at a value between 0.1 and 10 volumes and wherein the ratio of the purge rate to the purge volume is between 40 and 7000 to minimize removal of the pore adsorbed straight chain components of the feed stream and to maximize removal of surface-adsorbed and the bed-entrapped contaminating components. The term "vapor hourly space velocity" refers to the purge medium charge rate expressed as vapor volumes (at purge conditions) per hour per volume of adsorbent. The term "purge volume" refers to the amount of purge medium in the purge effluent stream per cycle and is equivalent to one vapor volume displacement (at purge conditions) of total volume occupied by the sieve bed. Most efficient operations are conducted using a purge velocity of 170 to 680 vapor hourly space velocity and a purge medium volume of 0.2 to 6.0 and a purge gas rate to purge volume ratio of at least 50/1, when it is desired to attain exceptionally high n-paraffin product purity. The effluent from the purge step comprising purge medium, unadsorbed charge stock and surface adsorbed components of the charge stock together with some adsorbed n-paraffins removed from the sieve pores by the purge medium is returned to the fresh feed line as a supplemental charge to the adsorption vessel. Routing of the purge effluent in this manner permits readsorption by the sieve of the normal straight chain hydrocarbon components of the feed that had been removed therefrom in the purge step. In addition the normal praffins in the purge stream effluent are recovered in the process.

After completion of the purge step, the vessel is repressured to the desorption pressure which is advantageously about 11–75 p.s.i.g., and preferably about 1–25 p.s.i.g. above the highest pressure in the sieve vessel during the adsorption step. This repressuring step is necessary to permit more rapid desorption of the pore adsorbed straight chain components from the adsorbent and to facilitate removal of these components from the sieve by the desorbing medium in the desorption step. The desorption pressure is attained by discontinuing the flow of the purge effluent stream to the purge accumulator via line 28, while continuing the flow of purge medium into the adsorption vessel. The rate of flow of the desorbing medium into the adsorption vessel is about 0.25–3 liquid hourly space velocity (LHSV) to remove the pore adsorbed straight chain hydrocarbons from the sieve. The desorption effluent comprising a mixture of desorbed straight chain hydrocarbons and desorbing medium is recovered from the adsorption vessel and then treated to separately recover the desorbing medium and the desorbed straight chain hydrocarbons.

In the desorbing step, the desorbing medium employed is essentially of the same composition as the purge medium. Use of the same hydrocarbon composition as the purge and desorption media avoids the problem of product contamination with other hydrocarbons while simplifying the processing requirements. Choice of a suitable desorption medium for use in the practice of the present invention is largely dependent on the composition of the fresh feed, desorbent avails thereof and desired end product carbon number distribution. In general it has been found that most advantageous results are obtained when the desorption medium mixture is composed of a major amount, from 60 to about 90% by volume of the mixture of straight chain hydrocarbons having an average of about 1 to 3 carbon atoms less than the lightest straight chain hydrocarbon in the fresh feed charge to the adsorption vessel and a minor amount from 10 to about 40% by volume, of at least one light straight chain hydrocarbon or a mixture of straight chain hydrocarbons having an average of 5 to 7 carbon atoms less than the lightest straight chain hydrocarbon in the fresh feed charge to the adsorption vessel. Maintaining a carbon number spread of about 1 to 3 for the heavy desorption medium component and 5 to 7 for the light desorption medium component between the purge-desorption media and the fresh feed charge lightest component permits effective and rapid desorption times in the process of the present invention in addition to affording ease of separation of the desorbing medium from the desired product stream by fractionation. An additional and unexpected advantage is that less of the adsorbed straight chain hydrocarbon components of the feed are removed from the sieve pores during the purge step. Advantageously in the treatment of $C_{13}$–$C_{18}$ charge stocks, a purge-desorption medium mixture comprising about 80% by volume of normal undecane and 20% by volume of normal heptane has been found to be satisfactory. In processing heavier stocks, e.g., $C_{14}$–$C_{20}$ containing stocks, a desorption medium mixture composed of 70 to 90% by volume of $C_{11}$–$C_{13}$ straight chain hydrocarbons and 10 to 30% by volume of $C_7$–$C_9$ straight chain hydrocarbons has been found to give excellent results.

In the prior processes, the desorption step is generally the limiting factor in overall process time because of the amount of time required to effect removal of the adsorbed components from the sieve pores. The present process provides an improvement over prior processes by the combination of (a) using a desorbing medium admixture in the vapor state and comprising in itself an adsorbable normal paraffin hydrocarbon mixture, (b) a desorption medium mixture space velocity of 0.25 to 3 LHSV, and (c) additionally in terminating the desorption step when about 10–30% by weight of the pore adsorbed straight chain hydrocarbon components remain in the sieve pores. Such a desorbing combination will materially improve the desorption of the adsorbed straight chain components from the sieve pores. It has been found that at a desorption temperature of about 655° F. employing a 20% by volume n-heptane, 80% by volume n-undecane desorption medium mixture in the desorption of n-$C_{13}$–$C_{20}$ components from the adsorbent pores at a desorption medium space velocity in the range of about 2.0 LHSV, volumes liquid desorbent/hour/volume adsorbent, the adsorbed components can be removed to the extent of 80–90% in from about 16 to 22 minutes; at a 0.6 LHSV in from about 65 to 89 minutes.

In the desorption step of the present invention, the flow of desorbing medium admixture into the adsorption zone is countercurrent to the fresh feed charge which preferably is upflow. By operating in this manner, the lighter straight chain hydrocarbon components of the charge adsorbed in the pores of the adsorbent during the adsorption step are first desorbed, and, in turn, they assist the desorbing medium admixture in desorbing the adsorbed heavier straight chain hydrocarbon components nearer to the desorption outlet end of the vessel. Termination of the desorption cycle short of essentially complete removal of adsorbed straight chain hydrocarbons from the sieve pores permits the time of desorption to be materially decreased, i.e. in the order of 25–80%. Moreover, the throughput of the charge can be materially increased with the result that more charge stock can be treated per operating day and more product can be obtained.

At the termination of the desorption step, the adsorption vessel is depressured to the adsorption pressure and the cyclic operation is repeated.

While the above detailed description of the process of the present invention has referred to a single vessel operation for simplicity, it is within the purview of the invention to produce same on a multi-vessel basis, wherein one or more separate vessels are used in each of the main process steps, i.e. adsorption, purge and desorption while another set of vessels are on a regeneration cycle. Periodic regeneration of the selective adsorbent is needed to restore the activity thereof after use in the process for an extended processing period. Suitable regeneration techniques known in the art such as, for example, the process disclosed in the Carter et al. U.S. Pat. 2,908,639 can be used.

The process of the present invention is essentially a timed cyclic process. It has been found that in cases where a relatively long desorption time is required satisfactory results have been achieved if the adsorption step is accomplished in one-third of the total processing time, the remaining two-thirds being taken up by the balance of the processing steps, e.g. depressure, purge, repressure, desorption and depressure. In general in processing gas oil type charge stocks to recover the straight chain hydrocarbon components thereof it has been found that the following time sequence is advantageous: adsorption, 18.5 minutes; depressure, 0.5 minute; purge 1.0 minute; repressure, 0.5 minute; desorption, 35.0 minutes; a total cycle time of 55.5 minutes.

Under certain circumstances wherein the feed stock properties, carbon number distribution of straight chain hydrocarbon product, desorbing medium employed, etc., result in very short desorption times, it is more advantageous to accomplish the adsorption step in about one-half of the total processing time with the remaining time being taken up with the depressure, purge, repressure, desorption and depressure steps.

With reference to the accompanying drawing, in the adsorption step, the valves in lines 26, 36, 41, 43 and 44 are in the closed position. At the termination of the adsorption step the valve in line 41 opens and permits the desorbing medium mixture maintained in the lines 40 and 41 under pressure and at elevated temperature, to be by-passed around the adsorption vessel. At the same time the valve in line 26 is opened to decrease the pressure in the adsorption vessel 14A (on the purge cycle). Then the valve in line 44 is opened to permit passage of a stream of desorbing medium mixture into vessel 14A for the purging step. At the completion of the purging step, the vessel is repressured by the flow of the stream of desorbing medium mixture into the vessel until the desorption pressure is reached. The valves in lines 41 and 44 are then closed and the valves in lines 43 and 36 are opened substantially simultaneously with the closing of valves in lines 41 and 44. At the conclusion of the desorption step the valves in lines 43 and 36 are closed. Operating with this valve switching sequence permits the yield of high purity normal paraffins to be increased without damaging the sieve bed by pressure variations during this portion of the cycle. This embodiment further permits use of low purge volume displacements during the purge step and minimizes the loss of adsorbed normal paraffins from the sieve pores during the purge cycle.

In carrying out the process of the present invention under circumstances in which a relatively long desorption time is required, it has been found advantageous to employ a three sieve case system wherein one sieve case is on the adsorption cycle and the remaining two cases are on the desorption cycle (i.e. includes the depressure, purge, repressure and desorption steps). Operating with two cases on the desorption cycle permits a lower desorbing medium mixture space velocity to be employed since the available desorption time is lengthened for a given total cycle time. The beneficial results obtained by operation in this manner include increased sieve utilization at a given desorption rate or lower desorption medium requirements at the same desorption rate. It is necessary to carry out desorption of the two sieve cases on the desorption cycle in parallel to prevent readsorption of the desorbed normal paraffins at the inlet of the second sieve case. Series desorption in the sieve cases is to be avoided for this reason.

Following is a description by way of example of a method of carrying out the process of the present invention.

EXAMPLE I

A hydrotreated gas oil fraction having a boiling point range of 500 to 574° F. and containing 22.1% by weight of $C_{13}$–$C_{18}$ straight chain hydrocarbons is charged at a temperature of 655° F. and a pressure of 12 p.s.i.g. and a feed rate of 2816 gm./hr. to the lower end of an adsorption vessel measuring 43 inches by 3 inches in diameter, having an internal volume of about 0.2 cubic feet and containing about 8.7 pounds of $\frac{1}{16}$ inch extruded molecular sieve selective adsorbent, sold under the trade name Linde Molecular Sieve Type 5A–45. There is recovered from the other end of the vessel an adsorption effluent stream comprising 71.6% by weight $C_{13}$–$C_{18}$ non-straight chain hydrocarbons, 2.0% by weight of $C_{13}$–$C_{18}$ straight chain hydrocarbons, and 26.4% by weight of the desorbing medium mixture. The recovered adsorption effluent is fractionated and there is separately recovered $C_{13}$–$C_{18}$ non-straight chain hydrocarbons in a yield of 80.1% by weight, basis fresh feed. In the adsorption vessel the selective adsorbent adsorbed the straight chain hydrocarbon components of the feed to the extent that after about 16 minutes on the adsorption cycle the adsorbent is saturated with the straight chain hydrocarbon components. The flow of feed is continued to the adsorption zone until a total time of 18.5 minutes elapsed at which time there is a 10% overcharge of straight chain hydrocarbons therein. The feed into the adsorption vessel is then discontinued and the vessel depressed to about 1.0 p.s.i.g. in 0.5 minute. After attaining the reduced purge pressure, a purge stream of the desorbing medium mixture in the vapor state comprising 90% by volume of n-undecane, and 10% by volume of n-heptane, is passed into the adsorption vessel at a rate of 362 vapor hourly space velocity ($V_0$/hr./$V_A$) and countercurrent to the direction of the feed thereto. The flow of the purge medium is continued for 1.0 minute at which time 5.0 purge volumes had been used. The ratio of the purge medium vapor hourly space velocity to the purge volume is about 72/1. The purge effluent comprising 11.5% by weight of surface adsorbed materials, 72.9% by weight of purge medium and 15.6% by weight of pore adsorbed $C_{13}$–$C_{18}$ straight chain hydrocarbons, is removed at a 7130 gm./hr. rate, then passed through a cooler-accumulator to reduce the temperature and pressure to about 90° F. and 1.0 p.s.i.g.

After a purge period of about 1.0 minute, the flow of purge effluent from the adsorption vessel is discontinued.

The desorbing medium mixture, having the same composition as the purge medium described above, is passed in the adsorption vessel at 655° F. into the adsorption vessel in the same direction as the purge medium at a rate of 1.5 liquid hourly space velocity ($V_0$/hr./$V_A$) to repressure the vessel to the desorption pressure of about 20 p.s.i.g. The repressuring operation is completed in about 0.5 minute. The flow of desorbing medium mixture is continued for the remainder of 35.0 minutes of the desorption period. There is recovered a desorption effluent which on subsequent separation yields the following fractions: $C_{13}$–$C_{18}$ straight chain hydrocarbons, 19.9% by weight yield, basis fresh feed, 93.1% by weight desorbing medium mixture, basis total desorbing medium feed (including purge).

The flow of the desorbing medium mixture to the adsorption vessel is discontinued when 90% of the pore adsorbed straight chain hydrocarbons are removed from the sieve pores. The $C_{13}$–$C_{18}$ straight chain hydrocarbon product has a purity of 97.8% by weight and is obtained in a yield of 90.0%, by weight, basis fresh feed content of straight chain hydrocarbons. The sieve utilization value is 1.134 pound of $C_{13}$–$C_{18}$ straight chain hydrocarbon product per day per pound of molecular sieve, a 6.4% increase over the utilization value of Comparative Example A below.

EXAMPLE II

The procedure of Example I above is repeated except that the desorbing medium mixture composition is 80% by weight of n-undecane, 20% n-heptane. The straight chain hydrocarbon overcharge in the adsorption period is 10%, and the percentage desorption of straight chain hydrocarbons in the desorption period is 90%. The sieve utilization value is 1.152, a 8.1% increase over the utilization value of Comparative Example A below. The $C_{13}$–$C_{18}$ product purity is 97.8%.

EXAMPLE III

The procedure of Example I is repeated except that the desorbing medium mixture composition is 70% by weight of n-undecane, 30% n-heptane. The percentage overcharge in the adsorption period is 10%, and the percentage desorption in the desorption period is 90%. The sieve utilization value is 1.132, a 6.2% increase over the utilization value of Comparative Example A below. The $C_{13}$–$C_{18}$ product purity is 97.8%.

COMPARATIVE EXAMPLE A

The procedure of Example I is repeated except that the desorbing medium composition is 100% n-undecane. The percentage overcharge and the percentage desorption are 10% and 90%, respectively. The sieve utilization value is 1.066 and the product purity is 97.7%.

The above Examples I–III demonstrate that by carrying out the process of the present invention in the manner herein described one is able to attain an increased sieve utilization value which results in more straight chain hydrocarbon product being produced per day than by prior processes using conventional desorbing medium.

It has been found that using more than about 40% by volume of the light straight chain hydrocarbon in the heavy straight chain hydrocarbon desorbing medium does not produce any additional beneficial effect in terms of reduced loss of the sieve adsorbed straight chain hydrocarbon components of the feed without a corresponding decrease in process efficiency in terms of slower desorption rate. The result is a net loss in product yield.

The use of less than about 10% of the light straight chain hydrocarbons in the desorbing medium should be avoided because the loss of the pore adsorbed straight chain hydrocarbon components of the feed during the purge period is correspondingly higher.

It is surprising that the addition of minor amounts of a lower boiling straight chain hydrocarbon to a high boiling straight chain hydrocarbon desorbing medium results in an unpredictable improvement in the efficiency of a straight chain hydrocarbon separation process. One would expect that such an addition would be detrimental since the presence of lower boiling straight chain hydrocarbons decreases the desorption rate, i.e. less straight chain hydrocarbons are removed from the sieve pores per unit of desorbing medium.

In the process of the present invention, it has been found that the decrease in desorption rate due to the presence of minor amounts of lower boiling straight chain hydrocarbons in the desorbing medium is more than offset by the advantages resulting during the purge period wherein a reduced amount of adsorbed straight chain hydrocarbons components of the feed is removed from the molecular sieve during the purge step of the process. The net result is improved sieve utilization, i.e., more straight chain hydrocarbon product per day per pound of molecular sieve.

An additional advantage accrues from the addition of a minor amount of lower boiling straight chain hydrocarbons to the higher boiling straight chain hydrocarbon desorbing medium. In the process of the present invention the purge stream effluent is passed from the adsorption vessel through an accumulator and blended with the fresh feed to the adsorption vessel during the adsorption step. The presence of the lower boiling straight chain hydrocarbons in the desorbing medium which also is used as the purge medium during the purge period aids in reducing the dew point of the fresh feed which is subjected to vaporization before being introduced into the adsorption vessel during the adsorption step. This reduction in the fresh feed dew point permits the feed stream to be vaporized at a lower temperature and avoids undesirable thermal side reactions such as cracking and polymerization usually associated with heating of heavy petroleum fractions at relatively high temperatures, i.e. in the order of 650° F. and upwards.

Obviously, many modifications and variations of the invention as hereinbefore set forth may be made without departing from the spirit and scope thereof and therefore only such limitations should be imposed as are indicated in the appended claims.

I claim:

1. In a cyclic vapor phase process for the separation of a petroleum fraction using a molecular sieve selective adsorbent, comprising an adsorption step, a purge step and a desorption step, the improvement which comprises carrying out the purge and the desorption steps with a desorbing medium consisting essentially of a straight chain hydrocarbon mixture composed of a major amount of at least one heavy straight chain hydrocarbon having a molecular weight of 1 to 3 carbon atoms less than the molecular weight of the lighest straight chain hydrocarbon component of the petroleum fraction being separated and a minor amount of at least one light straight chain hydrocarbon having a molecular weight of from 5 to 7 carbon atoms less than the molecular weight of the lighest straight chain hydrocarbon component of the petroleum fraction being separated.

2. The process of claim 1 wherein the petroleum fraction is a gas oil containing $C_{13}$–$C_{18}$ straight chain and non-straight chain hydrocarbons.

3. The process of claim 1 wherein the petroleum fraction is a gas oil containing $C_{13}$–$C_{20}$ straight chain and non-straight chain hydrocarbons.

4. The process of claim 1 wherein the straight chain hydrocarbon mixture used as the desorbing medium contains from 60 to 90% by volume of said heavy straight chain hydrocarbon and 10 to 40% by volume of said light straight chain hydrocarbon.

5. The process of claim 1 wherein the straight chain hydrocarbon mixture used as the desorbing medium contains from 70 to 90% by volume of said heavy straight chain hydrocarbon and 10 to 30% by volume of said light straight chain hydrocarbon.

6. The process of claim 1 wherein the straight chain hydrocarbon mixture used as the desorbing medium contains from 75 to 85% by volume of n-undecane and 15 to 25% by volume of n-heptane.

7. The process for the separation of $C_{13}$–$C_{20}$ straight chain hydrocarbons from a petroleum fraction which comprises in an adsorption step contacting said petroleum fraction in the vapor phase at an elevated temperature and pressure and with a 5 A. type molecular sieve selective adsorbent to adsorb the straight chain hydrocarbons, in a purge step at a lower pressure countercurrently contacting said molecular sieve with a vaporized desorbing medium consisting essentially of a straight chain hydrocarbon mixture containing a major portion of at least one heavy straight chain hydrocarbon having a molecular weight of 1 to 3 carbon atoms less than the lightest straight chain hydrocarbon component of the petroleum fraction and a minor portion of at least one light straight chain hydrocarbon having a molecular weight of 5 to 7 carbons less than the lightest straight chain hydrocarbon component of the petroleum fraction, at a purge medium rate of between 50 and 1000 vapor hourly space velocity and a purge medium volume in the range of 0.1 to 10 volumes of vapor per unit bed volume and wherein the ratio of the purge medium rate to the purge medium volume is between 40/1 and 7000/1, and in a desorption step at a higher pressure than the adsorption pressure, removing the adsorbed straight chain hydrocarbons from the molecultar sieve with a vaporized desorbing medium mixture having the same composition as the desorbing medium employed in the purge step.

8. The process of claim 7 wherein the desorbing medium contains from 60 to 90% by volume of said heavy straight chain hydrocarbon and 10 to 40% by volume of said light straight chain hydrocarbon.

9. The process of claim 7 wherein the desorbing medium contains from 75 to 85% by volume of n-undecane and from 15 to 25% by volume of n-heptane

References Cited

UNITED STATES PATENTS

| | | | |
|---|---|---|---|
| 2,891,902 | 6/1959 | Hess et al. | 208—65 |
| 3,370,002 | 2/1968 | Cottle | 208—310 |
| 3,373,103 | 3/1968 | Cooper et al. | 208—310 |
| 3,392,113 | 7/1968 | De Rosset | 208—310 |
| 3,395,097 | 7/1968 | Senn | 208—310 |

HERBERT LEVINE, Primary Examiner

U.S. Cl. X.R.

260—676

UNITED STATES PATENT OFFICE
CERTIFICATE OF CORRECTION

Patent No. 3,539,501     Dated November 10, 1970

Inventor(s) Richard W. Stokeld, Jr.

It is certified that error appears in the above-identified patent and that said Letters Patent are hereby corrected as shown below:

Column 1, line 42, "hydrocarbon" should read -- hydrocarbons --; line 53, ":" should read -- ; --. Column 2, line 39, "hydrocarbon" should read -- hydrocarbons --; line 40, "straight", second occurrence, should read -- still --; line 46, "acomplished" should read -- accomplished --; line 51, "acrylic" should read -- acylic --. Column 3, line 66, "pressuring" should read -- depressuring --; line 68, "line" should read -- lines --. Column 6, line 25, after "mixture" insert -- , of at least one heavy straight chain hydrocarbon or a mixture --. Column 8, line 60, "depressed" should read -- depressured --.

Signed and sealed this 9th day of March 1971.

(SEAL)
Attest:

EDWARD M. FLETCHER, JR.
Attesting Officer

WILLIAM E. SCHUYLER, JR.
Commissioner of Patents